US009580162B2

(12) United States Patent
Roach

(10) Patent No.: US 9,580,162 B2
(45) Date of Patent: *Feb. 28, 2017

(54) BALLONET FOR A BALLOON

(71) Applicant: Google Inc., Mountain View, CA (US)

(72) Inventor: Kevin Roach, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,456

(22) Filed: Apr. 4, 2016

(65) Prior Publication Data

US 2016/0214699 A1    Jul. 28, 2016

Related U.S. Application Data

(63) Continuation of application No. 14/171,355, filed on Feb. 3, 2014, now Pat. No. 9,327,817.

(51) Int. Cl.
| | | |
|---|---|---|
| *B64B 1/00* | (2006.01) | |
| *B64B 1/60* | (2006.01) | |
| *B64B 1/58* | (2006.01) | |
| *B64B 1/40* | (2006.01) | |

(52) U.S. Cl.
CPC . *B64B 1/60* (2013.01); *B64B 1/40* (2013.01); *B64B 1/58* (2013.01)

(58) Field of Classification Search
CPC .............. B64D 1/02; B64D 1/04; B64D 1/40; B64D 1/58; B64D 1/60; B64B 1/02; B64B 1/04; B64B 1/40; B64B 1/58; B64B 1/60

See application file for complete search history.

(56) References Cited

U.S. PATENT DOCUMENTS

| | | | |
|---|---|---|---|
| 4,696,444 A | 9/1987 | Regipa | |
| 4,711,416 A * | 12/1987 | Regipa | ..................... B64B 1/60 244/126 |
| 6,427,943 B2 * | 8/2002 | Yokomaku | ................ B64B 1/60 244/127 |
| 7,156,342 B2 | 1/2007 | Heaven et al. | |
| 7,469,857 B2 | 12/2008 | Voss | |
| 2002/0179771 A1 | 12/2002 | Senepart | |
| 2004/0180161 A1* | 9/2004 | Lavan | ...................... B32B 5/02 428/35.7 |
| 2016/0083068 A1* | 3/2016 | Crites | ...................... B64B 1/40 244/31 |

FOREIGN PATENT DOCUMENTS

JP    2000219198 A    8/2000

* cited by examiner

*Primary Examiner* — Tien Dinh
*Assistant Examiner* — Aaron Rodziwicz
(74) *Attorney, Agent, or Firm* — McDonnell Boehnen Hulbert & Berghoff LLP

(57) ABSTRACT

Methods and apparatuses are disclosed for altitude control of a high-altitude balloon. A bladder or ballonet is provided within an envelope of a balloon. The bladder is tubular-shaped, is inflatable, and is foldable for insertion into the balloon prior to performing a final seam on the balloon. To stabilize the bladder, the bladder may be attachable to one or more interior surfaces of the envelope with one or more ropes.

16 Claims, 8 Drawing Sheets

BALLONET FOR A BALLOON

CROSS-REFERENCE TO RELATED APPLICATION

This application is a continuation of U.S. patent application Ser. No. 14/171,355 filed on Feb. 3, 2014, which is incorporated herein by reference in its entirety and for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

A bladder or ballonet is provided within an envelope of a balloon. The bladder is shaped such that it is generally circular with flattened poles, or pumpkin-shaped, and is foldable for insertion into the balloon prior to performing a final seam on the balloon. The bladder's shape is the same as or similar to the shape of the curvature.

In one aspect, an example inflatable bladder includes a cylindrical body comprising a top end and a bottom end, a top surface at the top end comprising a mounting point, and a first rope affixed to the mounting point. The inflatable bladder is sized and shaped for insertion into an envelope of a balloon. When the inflatable bladder is inserted into the balloon, the first rope is attachable to an interior surface of the envelope.

In another aspect, an example variable buoyancy system involves a balloon comprising an envelope and a ballonet within the envelope interior. The envelope comprises an interior that contains a liquid or gas, and the ballonet comprises a cylindrical body comprising a top end and a bottom end, a top surface at the top end comprising a mounting point, and a first rope with a first end affixed to the mounting point and a second free end. The second free end is attachable to a surface on the interior of the envelope.

In a further aspect, an example method involves providing a plurality of sheets, seaming two or more of the plurality of sheets together to form a tubular-shaped ballonet, inserting the ballonet into a balloon, and sealing the ballonet with a gasket at a base of the balloon.

These as well as other aspects, advantages, and alternatives, will become apparent to those of ordinary skill in the art by reading the following detailed description, with reference where appropriate to the accompanying drawings.

DETAILED DESCRIPTION

Figure 1:
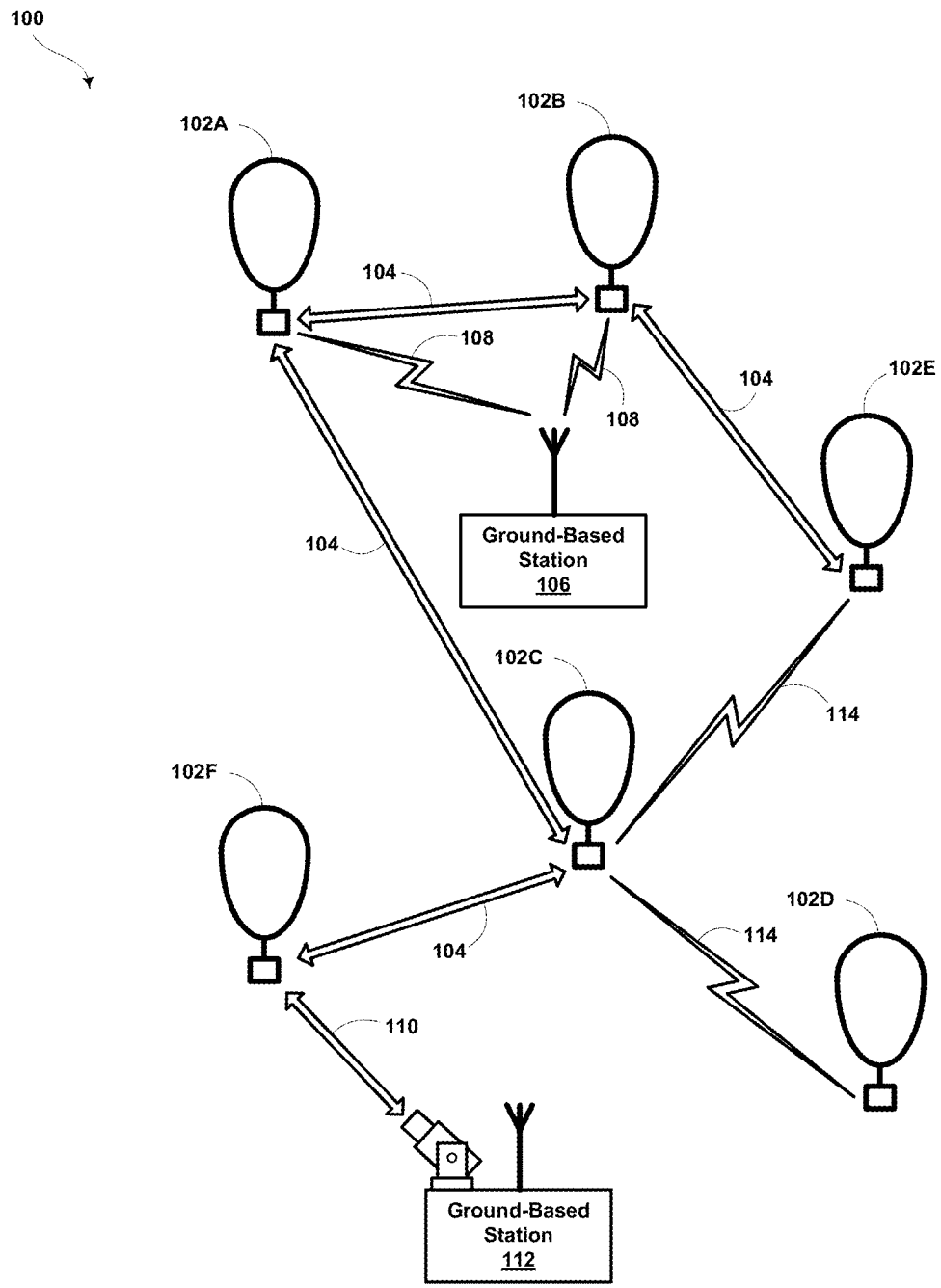
FIG. 1 is a simplified diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein generally relate to an inflatable bladder for use with a high-altitude balloon deployed in the stratosphere. In order that the balloons can provide a reliable mesh network in the stratosphere, inflatable bladders may be installed within the balloons for altitude control. By controlling the balloon's buoyancy, balloons can be driven up and down in the atmosphere or held at a constant altitude for long duration flights. Altitude control thus enables some form of navigation for the balloon.

An inflatable bladder, or ballonet, may be inflated with a liquid and/or gas to add mass to a constant-volume (e.g., superpressure) balloon, causing the balloon to descend; and conversely, deflating the bladder causes the balloon to rise. In some example embodiments, an inflatable bladder may comprise a tubular shape manufactured from two or more sheets of material seamed together and a mounting point on one or both of a top surface and a bottom surface for mounting a stabilizing rope. The stabilizing ropes are attachable to the inside surface of a balloon when the bladder is inside the balloon. Advantageously, the stabilizing ropes prevent the inflatable bladder from filling to one side during the filling process, which in turn prevents destabilizing the balloon.

Such an inflatable bladder is easy and inexpensive to fabricate and is scalable in size. For example, using wider sheets or attaching more than two sheets together may provide for a larger diameter bladder. Additionally, the shape of the inflatable bladder allows for compact folding of the bladder for insertion into a balloon, providing for reduced manipulation or handling of the balloon. Other bladders are typically installed into the balloon from the base and may become bunched up. The shape of the present inflatable bladder allows for the bladder to be prefolded and installed before closing the least envelope seam. Seaming together more than one sheet as opposed to using a circular piece allows for easier and less folding that is less damaging to the structure of the inflatable bladder.

2. Example Balloon Networks

In an example balloon network, balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured to communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
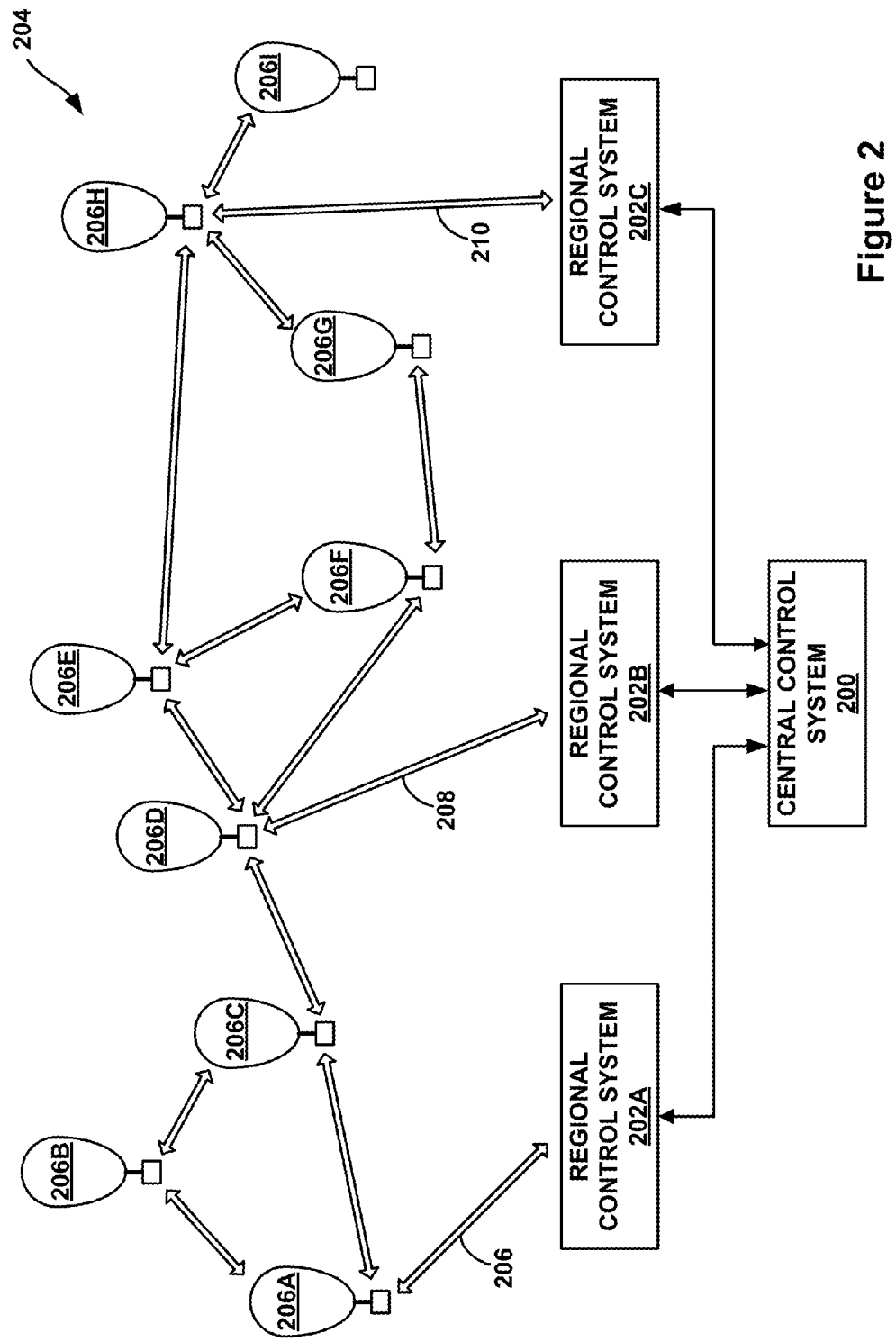
FIG. 2 is a diagram illustrating a balloon-network control system, according to an example embodiment.

In some embodiments, mesh networking and/or station-keeping functions may be centralized. For example, FIG. 2 is a diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be a particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in the balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_I$, wherein $d_I$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
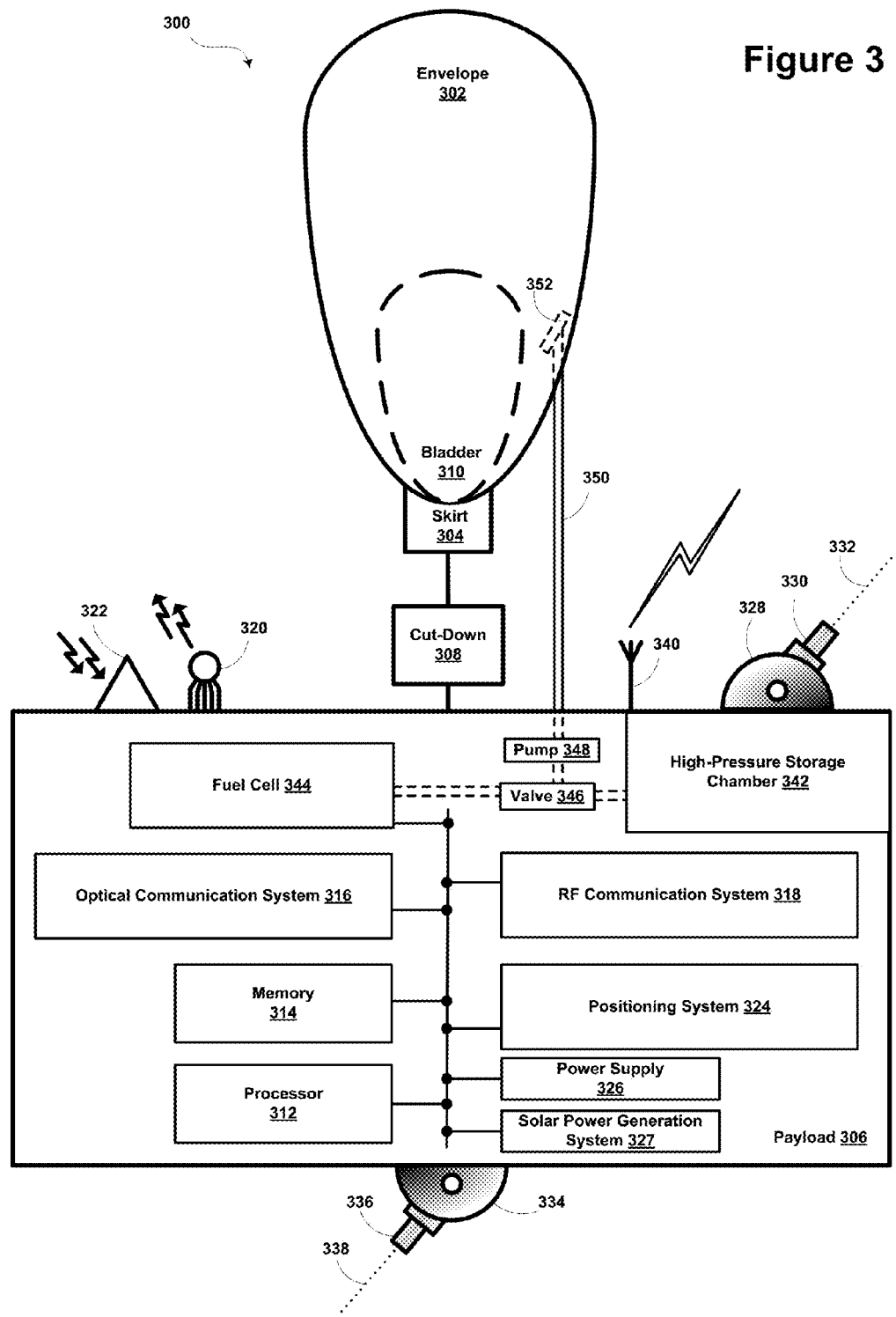
FIG. 3 is a simplified diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by power supply 326.

Further, payload 306 may include various types of other systems and sensors 328. For example, payload 306 may include one or more video and/or still cameras, a GPS system, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

In a further aspect, balloon 300 includes a gas-flow system, which may be used for altitude control. In the illustrated example, the gas-flow system includes a high-pressure storage chamber 342, a gas-flow tube 350, and a pump 348, which may be used to pump gas out of the envelope 302, through the gas-flow tube 350, and into the high-pressure storage chamber 342. As such, balloon 300 may be configured to decrease its altitude by pumping gas out of envelope 302 and into high-pressure storage chamber 342. Further, balloon 300 may be configured to move gas into the envelope and increase its altitude by opening a valve 352 at the end of gas-flow tube 350, and allowing lighter-than-air gas from high-pressure storage chamber 342 to flow into envelope 302.

Note that the high-pressure storage chamber 342, in an example balloon, may be constructed such that its volume does not change due to, e.g., the high forces and/or torques resulting from gas that is compressed within the chamber. In an example embodiment, the high-pressure storage chamber 342 may be made of a material with a high tensile-strength to weight ratio, such as titanium or a composite made of spun carbon fiber and epoxy. However, high-pressure storage chamber 342 may be made of other materials or combinations of materials, without departing from the scope of the invention.

In a further aspect, balloon 300 may be configured to generate power from gas flow out of high-pressure storage chamber 342 and into envelope 302. For example, a turbine (not shown) may be fitted in the path of the gas flow (e.g., at the end of gas-flow tube 350). The turbine may be a gas turbine generator, or may take other forms. Such a turbine may generate power when gas flows from high-pressure storage chamber 342 to envelope 302. The generated power may be immediately used to operate the balloon and/or may be used to recharge the balloon's battery.

In a further aspect, a turbine, such as a gas turbine generator, may also be configured to operate "in reverse" in order to pump gas into and pressurize the high-pressure storage chamber 342. In such an embodiment, pump 348 may be unnecessary. However, an embodiment with a turbine could also include a pump.

In some embodiments, pump 348 may be a positive displacement pump, which is operable to pump gas out of the envelope 302 and into high-pressure storage chamber 342. Further, a positive-displacement pump may be operable in reverse to function as a generator.

Further, in the illustrated example, the gas-flow system includes a valve 346, which is configured to adjust the gas-flow path between envelope 302, high-pressure storage chamber 342, and fuel cell 344. In particular, valve 346 may adjust the gas-flow path such that gas can flow between high-pressure storage chamber 342 and envelope 302, and shut off the path to fuel cell 344. Alternatively, valve 346 may shut off the path high-pressure storage chamber 342, and create a gas-flow path such that gas can flow between fuel cell 344 and envelope 302.

Balloon 300 may be configured to operate fuel cell 344 in order to produce power via the chemical reaction of hydrogen and oxygen to produce water, and to operate fuel cell 344 in reverse so as to create hydrogen and oxygen from water. Accordingly, to increase its altitude, balloon 300 may run fuel cell 344 in reverse so as to generate gas (e.g., hydrogen gas), which can then be moved into the envelope to increase buoyancy. Specifically, balloon may increase its altitude by running fuel cell 344 in reverse, adjusting valve 346 and valve 352 such that hydrogen gas produced by fuel cell 344 can flow from fuel cell 344, through gas-flow tube 350, and into envelope 302.

To run fuel cell 344 "in reverse," balloon 300 may utilize an electrolysis mechanism in order to separate water molecules. For example, a balloon may be configured to use a photocatalytic water splitting technique to produce hydrogen and oxygen from water. Other techniques for electrolysis are also possible.

Further, balloon 300 may be configured to separate the oxygen and hydrogen produced via electrolysis. To do so, the fuel cell 344 and/or another balloon component may include an anode and cathode that attract the positively and negatively charged O— and H— ions, and separate the two gases. Once the gases are separated, the hydrogen may be directed into the envelope. Additionally or alternatively, the hydrogen and/or oxygen may be moved into the high-pressure storage chamber.

Further, to decrease its altitude, balloon 300 may use pump 348 to pump gas from envelope 302 to the fuel cell 344, so that the hydrogen gas can be consumed in the fuel cell's chemical reaction to produce power (e.g., the chemical reaction of hydrogen and oxygen to create water). By consuming the hydrogen gas the buoyancy of the balloon may be reduced, which in turn may decrease the altitude of the balloon.

It should be understood that variations on the illustrated high-pressure storage chamber are possible. For example, the high-pressure storage chamber may take on various sizes and/or shapes, and be constructed from various materials, depending upon the implementation. Further, while high-pressure storage chamber 342 is shown as part of payload 306, high-pressure storage chamber could also be located inside of envelope 302. Yet further, a balloon could implement multiple high-pressure storage chambers. Other variations on the illustrated high-pressure storage chamber 342 are also possible.

It should also be understood that variations on the illustrated air-flow tube 350 are possible. Specifically, any configuration that facilitates movement of gas between the high-pressure storage chamber and the envelope is possible.

Yet further, it should be understood that a balloon and/or components thereof may vary from the illustrated balloon 300. For example, some or all of the components of balloon 300 may be omitted. Components of balloon 300 could also be combined. Further, a balloon may include additional components in addition or in the alternative to the illustrated components of balloon 300. Other variations are also possible.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
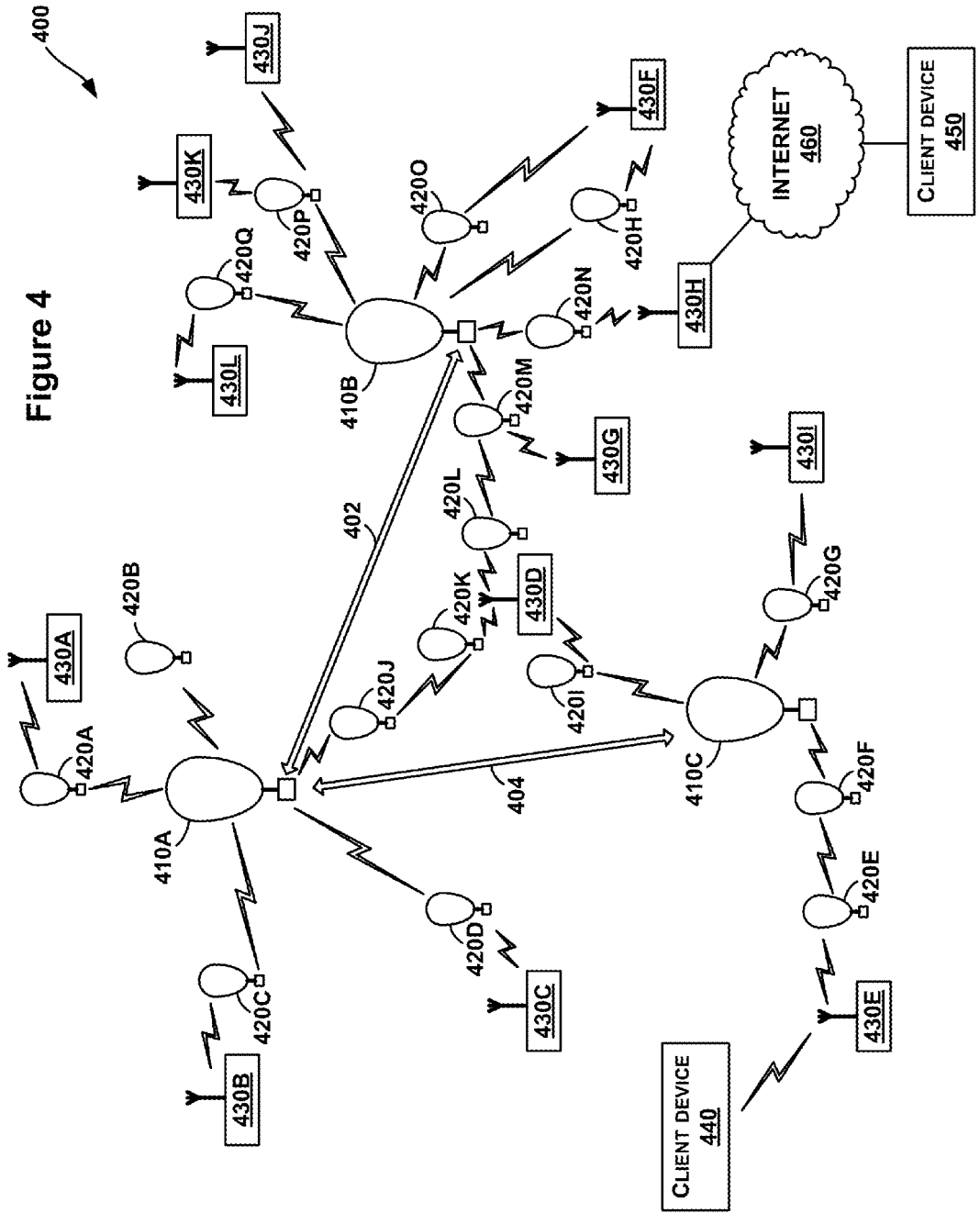
FIG. 4 is a simplified diagram illustrating a balloon network that includes super-nodes and sub-nodes, according to an example embodiment.

FIG. 4 is a simplified diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Example Ballonet for Use with a High-Altitude Balloon

Figure 5:
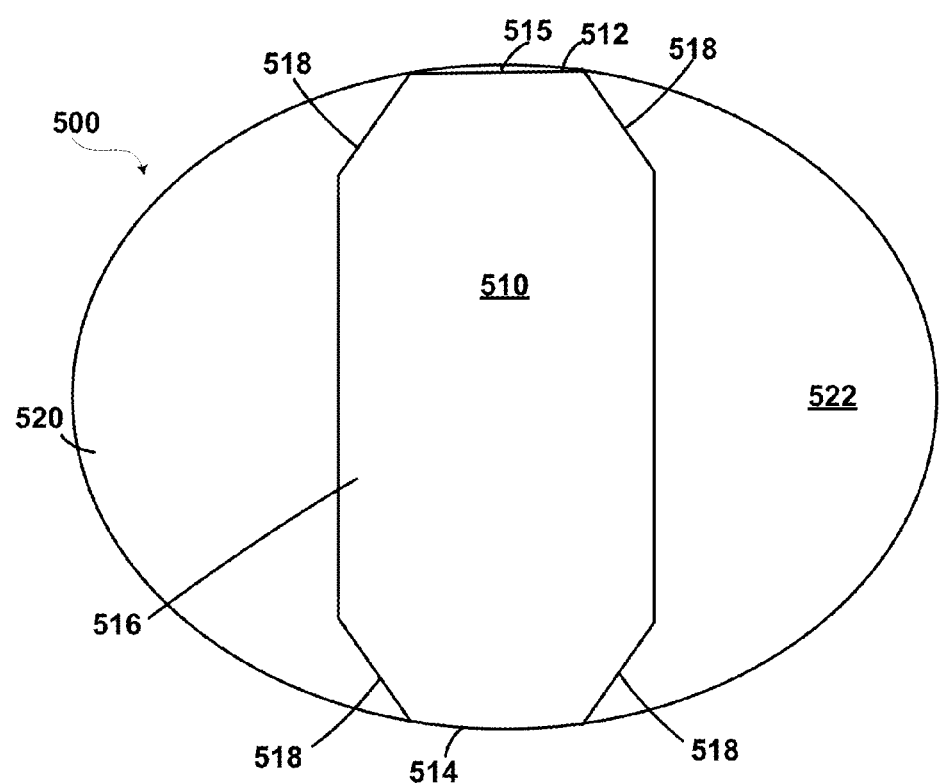
FIG. 5 is a simplified diagram illustrating a ballonet for use inside of a high-altitude balloon, according to an example embodiment.

FIG. 5 is a simplified diagram 500 illustrating a ballonet 510 for use inside of a high-altitude balloon 520, according to an example embodiment.

The balloon 520 may take the same form as or be similar in form to the balloon 300 of FIG. 3, in some example embodiments. The balloon 520 may comprise an envelope 522 and may take various forms, which may be currently well-known or yet to be developed. For instance, the envelope 522 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 522 may vary depending upon the particular implementation. The envelope 522 is shown to have a generally rounded shape; and more specifically, a pumpkin shape wherein the top and bottom of the envelope comprise a shallower radius of curvature than the sides of the envelope. Additionally, the envelope 522 may be filled with various different types of gases, such as helium and/or hydrogen. Other types of gases are possible as well.

Moreover, the balloon 520 may be implemented into a balloon network such as the balloon networks of FIGS. 1-2 and 4.

The ballonet 510 may be an inflatable bladder within the balloon envelope 522, and may serve to provide altitude control inside the balloon. The ballonet 510 may comprise a flexible material, may be configured to inflate by insertion of liquid and/or gas, and may hold such liquid and/or gas. In some example embodiments described herein, the ballonet 510 is designed to comprise about 30% of the volume of the balloon envelope 522. However, other volume percents within the range of 20-50% may also be envisioned. The ballonet 510 may not need to have an ability to maintain any internal pressure of its own.

The buoyancy of the balloon 500 may be adjusted by changing the density and/or volume of the gas in ballonet 510. To change the density in ballonet 510, balloon 500 may be configured with systems and/or mechanisms for heating and/or cooling the gas in ballonet 510. Further, to change the volume, balloon 500 may include pumps or other features for adding gas to and/or removing gas from ballonet 510. Additionally or alternatively, to change the volume of ballonet 510, balloon 500 may include release valves or other features that are controllable to allow gas to escape from ballonet 510.

In an example embodiment, the balloon 500 interior could be filled with helium, hydrogen or other lighter-than-air material. The balloon 500 could thus have an associated upward buoyancy force. In such an embodiment, air in the ballonet 510 could be considered a ballast tank that may have an associated downward ballast force. In another example embodiment, the amount of air in the ballonet 510 could be changed by pumping air (e.g., with an air compressor) into and out of the ballonet 510. By adjusting the amount of air in the ballonet 510, the ballast force may be controlled. In some embodiments, the ballast force may be used, in part, to counteract the buoyancy force and/or to provide altitude stability.

The ballonet 510 is shown to be generally tubular in shape. The ballonet 510 may comprise a top end 512, a bottom end 514, a cylindrical body 516, and a plurality of tapered portions 518 that extend from the cylindrical body 516 and either the top end 512 or the bottom end 514.

Figure 6:
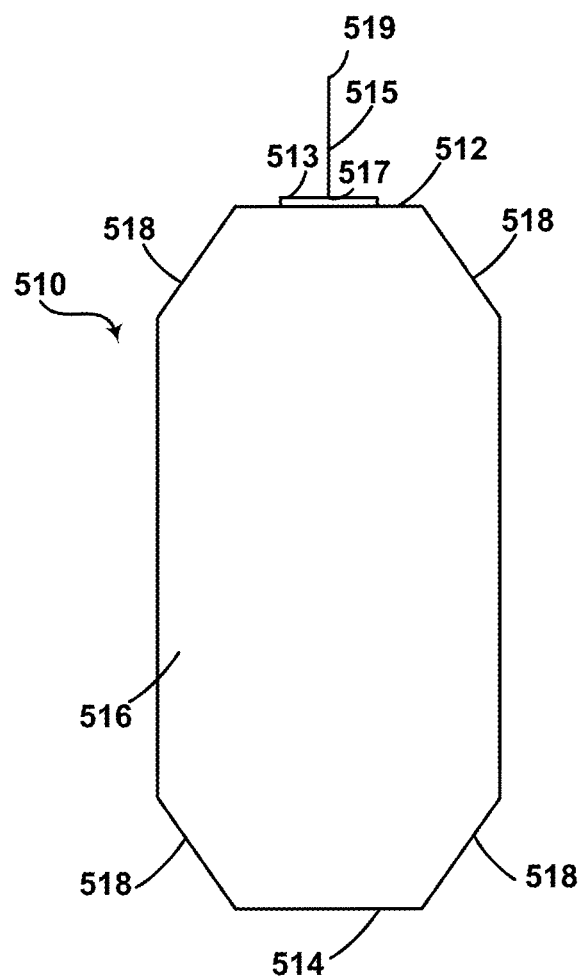
FIG. 6 is a simplified diagram illustrating the ballonet of FIG. 5, according to an example embodiment.

FIG. 6 is a simplified diagram further illustrating the ballonet 510 of FIG. 5. In one example embodiment, each of the tapered portions 518 may comprise a shallow angle tapering the cylindrical body walls inward as the tapered portion extends towards either the top end 512 or the bottom end 514. The tapered portions 518 may serve to improve the stability of the ballonet 510 as the ballonet fills with or is filled with liquid/air, or is cooled or heated. In some example embodiments, the angles between the tapered portions 518 and the cylindrical body 516 may be in the range of 10-45 degrees. The angles of the tapered portions 518 may be designed to correspond to a diameter of the cylindrical body 516, wherein a shallower angle within the 10-45 degree range is designed to correspond with a larger diameter of the cylindrical body 516 and vice versa.

The top end 512 of the ballonet 510 may comprise a surface with a flat seal to provide a mounting point 513 for a stabilizing rope 515. Such a stabilizing rope 515 may attach the ballonet 510 to a plate on the top inside surface of the balloon envelope 522. In the embodiment shown in FIG. 6, the stabilizing rope 515 is attached to the mounting point 513. In some example embodiments, the mounting point 513 may comprise a patch that is adhered to the surface at the top end 512 with a pressure sensitive adhesive or a heat seal. In some example embodiments, the surface at the top end 512 may comprise a thickened portion to hold the mounting point 513 and attached stabilizing rope 515. The thickened portion may comprise one or more additional layers of material that are adhered to or sealed to the mounting point 513, in some example embodiments. The additional layers may also be referred to as reinforcing patches, and may comprise the same material used for the ballonet 510. In other example embodiments, the additional layer or layers may be made from a carbon fiber reinforced tape. The thickened portion may serve to distribute the stress concentration at the mounting point 513. The thickened portion may comprise one or more patches of material. The stabilizing rope 515 may be attached to the mounting point 512 by threading the rope 515 through a hole in the mounting point 512, in some example embodiments. A reinforced eyelet may be formed around the hole through the layer or layers. In other example embodiments, the rope 515 may run between two or more of the additional layers instead of a through a hole. The rope may be attached to the mounting point 513 during the manufacturing process for the ballonet 510.

In operation, the shape of the ballonet 510 allows for folding along the longitude of the ballonet and inserted in the folded position within the balloon envelope 522 before completing the final seam of the balloon 522. This manner of folding and insertion advantageously provides for less overall handling of the balloon 520 during the insertion process. In some example embodiments, the folding and insertion process may automated and may be carried out via a control system comprising program instructions stored on a non-transitory computer readable medium. The folding an insertion process may comprise part of an automated building process of the balloon 520. The stabilizing rope 515 may attach to the mounting point 513 of the ballonet at a first end 517, and a second end 519 of the stabilizing rope 515 may then attach to the top plate of the balloon envelope 522. The stabilizing rope 515 serves to keep the ballonet 510 from filling to one side during a filling process, which would destabilize the balloon 520.

In some example embodiments, a second stabilizing rope may be attached to a surface on the bottom edge 514 of the ballonet 510. The second stabilizing rope may be attached to the surface on the bottom edge 514 in the same or a similar manner as described above for the stabilizing rope 515, and the second stabilizing rope may also comprise a first end attached to the ballonet 510 and a second, free end for attachment to a plate or an interior surface of the ballonet 510.

5. Illustrative Methods

Figure 7:
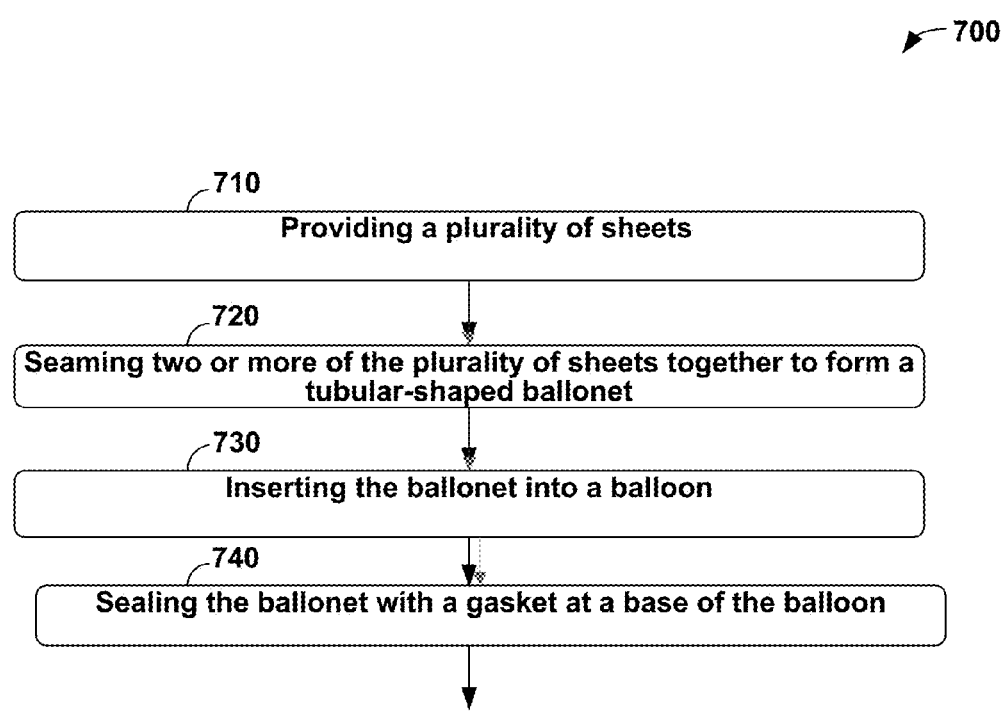
FIG. 7 is a flow chart of a method, according to an example embodiment.

FIG. 7 is a flow chart of a method, according to an example embodiment. Example methods, such as method 700 of FIG. 7, may be carried out by a control system. A control system may take the form of program instructions stored on a non-transitory computer readable medium (e.g., a memory) and a processor that executes the instructions. However, a control system may take other forms including software, hardware, and/or firmware. The control system may execute instructions to an automated assembly manufacturing line, in some example embodiments.

The method 700 is a method to provide a ballonet for a balloon, such as the ballonet 510 of FIGS. 5 and 6. As shown by block 710, method 700 involves providing a plurality of sheets. Each of the plurality of sheets may comprise a plastic film which may be coated with a barrier. Example barriers may comprise polyamides, ethylene vinyl alcohol (EVOH), and metallized aluminium, for example. The plurality of sheets may comprise pre-cut sheets or may be cut from one or more elongated pieces of the material. The method 700 may further include trimming the corners of the sheets at an angle to provide a taper such as the tapered portions 518 of FIGS. 5 and 6. The size of the sheets may be variable to provide for different sizes of ballonets. Two such example sheets are described and shown with reference to FIG. 8 below.

Then at block 720, method 700 involves seaming two or more of the plurality of sheets together to form a tubular-shaped ballonet. Two sheets of the same size may be placed on top of one another and aligned such that the edges of each sheet are aligned. The sheets may then be seamed together along the edges. If corners of a first sheet are trimmed or tapered along portions of the edges, the corners are seamed to the corresponding tapered corners of the second sheet. The top edges of the two sheets may be seamed together to form a flat or substantially flat sealed surface, forming, for example, a surface on the top end 512 of FIGS. 5 and 6. The method 700 may further include forming or attaching a mounting point, such as a patch, for example, to the surface at the top end 512. As discussed above, in some example embodiments the patch may be adhered to the top end 512 with a pressure sensitive adhesive or may be heat sealed.

At block 730, method 700 involves inserting the ballonet into a balloon. The ballonet may be folded prior to insertion into the balloon. In some example embodiments, the ballonet may be folded along the length or longitude of the cylindrical body.

At block 740, method 700 involves sealing the ballonet with a gasket at a base of the balloon. In some example embodiments, the gasket is a conformable gasket and the seal is a pinch seal.

Figure 8:
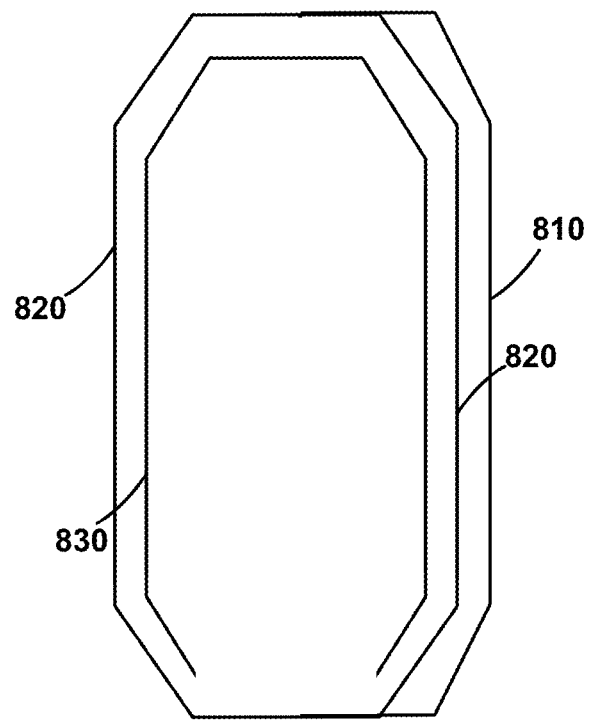
FIG. 8 is a simplified diagram illustrating sheets to manufacture a ballonet, according to an example embodiment.

FIG. 8 is a simplified diagram illustrating sheets to manufacture a ballonet, according to an example embodiment. In FIG. 8, two example sheets are used in accordance with the method of FIG. 7 to manufacture a ballonet that is insertable for use within a balloon envelope. A first sheet 810 and a second sheet 820 are provided. Seam lines 830 are shown on the first sheet 810. The first sheet 810 and the second sheet 820 may be attached to each other at the seam lines 830, as described with respect to block 720 in method 700. The sheets 810, 820 may be folded, curved, or otherwise bent to attach the portions of the sheets at the seam lines 830.

6. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A variable buoyancy system comprising:
an envelope; and
an inflatable bladder arranged inside of the envelope, wherein the inflatable bladder comprises:
   (a) a cylindrical body comprising a top end and a bottom end;
   (b) a top exterior surface at the top end comprising a mounting point; and
   (c) a first rope affixed to the mounting point of the inflatable bladder, wherein the first rope extends from the mounting point and attaches an interior surface of the envelope, thereby attaching the top exterior surface of the inflatable bladder to the interior surface of the envelope.

2. The variable buoyancy system of claim 1, wherein the envelope is a superpressure envelope.

3. The variable buoyancy system of claim 1, wherein the variable buoyancy system is part of or takes the form of a balloon.

4. The variable buoyancy system of claim 1, wherein the variable buoyancy system is configured for a high-altitude balloon that is deployable in the stratosphere.

5. The variable buoyancy system of claim 1, wherein the inflatable bladder is a ballonet configured to hold liquid or gas.

6. The variable buoyancy system of claim 5, wherein the ballonet is made from a plastic film coated with a barrier material.

7. The variable buoyancy system of claim 1 wherein the top surface comprises a flat seal.

8. The variable buoyancy system of claim 1, wherein the mounting point comprises a patch affixed to the top surface.

9. The variable buoyancy system of claim 1, wherein the inflatable bladder is foldable for insertion into the envelope.

10. The variable buoyancy system of claim 1, wherein the top exterior surface of the inflatable bladder comprises a flat seal, and wherein the mounting point comprises one or more additional layers of material.

11. A variable buoyancy system comprising:
an envelope; and
an inflatable bladder arranged inside of the envelope, wherein the inflatable bladder comprises:
   (a) a cylindrical body comprising a top end and a bottom end;
   (b) a top exterior surface at the top end comprising a mounting point; and
   (c) a first rope affixed to the mounting point of the inflatable bladder, wherein the first rope extends from the mounting point and attaches an interior surface of the envelope, thereby attaching the top exterior surface of the inflatable bladder to the interior surface of the envelope; and
   (d) a second rope with a first end affixed to a mounting point at the bottom end of the ballonet and a second free end that is attachable to another surface on the interior of the envelope.

12. A method of manufacturing a variable buoyancy system comprising:
providing a plurality of sheets, wherein a first sheet comprises a mounting point;
seaming two or more of the plurality of sheets together to form an inflatable bladder, wherein the inflatable bladder, when inflated, has a cylindrical body comprising a top end and a bottom end, wherein the seaming arranges the first sheet such that the mounting point is located on an exterior surface of the top end of the inflatable bladder;
inserting the inflatable bladder into a balloon envelope; and
affixing a first end of a first rope to the mounting point of the inflatable bladder and a second end of the first rope to an interior surface of the envelope, thereby attaching the top exterior surface of the inflatable bladder to the interior surface of the envelope.

13. The method of claim 12, further comprising trimming the corners of the two or more of the plurality of sheets at an angle to provide a taper.

14. The method of claim 12, further comprising folding the inflatable bladder to insert the ballonet into the envelope.

15. The method of claim 14, wherein the folding comprises folding the inflatable bladder in the longitudinal direction.

16. The method of claim 12, further comprising sealing the inflatable bladder with a gasket at a base of the envelope.

* * * * *